(12) United States Patent
Palumbo et al.

(10) Patent No.: US 10,972,505 B2
(45) Date of Patent: Apr. 6, 2021

(54) DISTRIBUTED BEHAVIORAL MONITORING

(71) Applicant: F-Secure Corporation, Helsinki (FI)

(72) Inventors: Paolo Palumbo, Espoo (FI); Dmitriy Komashinskiy, Espoo (FI)

(73) Assignee: F-Secure Corporation, Helsinki (FI)

( * ) Notice: Subject to any disclaimer, the term of this patent is extended or adjusted under 35 U.S.C. 154(b) by 278 days.

(21) Appl. No.: 15/840,376

(22) Filed: Dec. 13, 2017

(65) Prior Publication Data

US 2018/0176260 A1 Jun. 21, 2018

(30) Foreign Application Priority Data

Dec. 20, 2016 (GB) ..................................... 1621702

(51) Int. Cl.
| | | |
|---|---|---|
| *H04L 29/06* | (2006.01) | |
| *G06F 21/60* | (2013.01) | |
| *G06F 21/55* | (2013.01) | |
| *H04L 12/24* | (2006.01) | |

(52) U.S. Cl.
CPC ............ *H04L 63/20* (2013.01); *G06F 21/554* (2013.01); *G06F 21/604* (2013.01); *H04L 41/06* (2013.01); *H04L 63/1425* (2013.01); *H04L 63/1441* (2013.01)

(58) Field of Classification Search
CPC ..... H04L 63/20; H04L 63/1425; H04L 41/06; G06F 21/554; G06F 21/604
See application file for complete search history.

(56) References Cited

U.S. PATENT DOCUMENTS

| | | | |
|---|---|---|---|
| 2012/0072983 A1 | 3/2012 | McCusker et al. ............. 726/22 |
| 2013/0091539 A1* | 4/2013 | Khurana ............... G06F 21/552 |
| | | | 726/1 |
| 2013/0132551 A1 | 5/2013 | Bose et al. .................... 709/223 |
| 2014/0109168 A1* | 4/2014 | Ashley .................. H04L 63/102 |
| | | | 726/1 |
| 2015/0161394 A1 | 6/2015 | Ferragut et al. |
| 2016/0162674 A1 | 6/2016 | Friedman |
| 2018/0018459 A1* | 1/2018 | Zhang ................... G06F 21/554 |

FOREIGN PATENT DOCUMENTS

| | | |
|---|---|---|
| EP | 1 418 484 A2 | 5/2004 |
| WO | WO 2010/114363 A1 | 10/2010 |

* cited by examiner

*Primary Examiner* — Noura Zoubair
(74) *Attorney, Agent, or Firm* — Harrington & Smith

(57) ABSTRACT

There are provided measures for improvement of distributed behavioral monitoring. Such measures exemplarily include receiving activity data indicative of a behavior of an entity to be monitored from at least one sensor sensing activity of the entity, wherein the at least one sensor is provided to an endpoint associated with said entity, assessing an activity represented by said activity data as malicious, validating a result of said assessing based on a categorization assigned to said entity in relation to said at least one sensor, and deciding, based on a result of said validating, on a response to said assessing.

18 Claims, 6 Drawing Sheets

DISTRIBUTED BEHAVIORAL MONITORING

FIELD

The present invention relates to improvement of distributed behavioral monitoring. More specifically, the present invention relates to measures (including methods, apparatuses and computer program products) for realizing improvement of distributed behavioral monitoring.

BACKGROUND

The present specification generally relates to distributed behavioral monitoring systems/scenarios in which sensors are provided on endpoints (and potentially elsewhere inside an organization). These sensors continuously collect, process and eventually upstream data to a centralized location (that can be locally deployed or hosted in a cloud), where this data is then analyzed via a detection pipeline for security breaches, anomalies or other inconsistencies.

With new security breaches being disclosed almost daily, the problem of cyber security has become an extremely significant one that is expected to grow in the upcoming years. This is encouraged by an ongoing digitalization of activities of privates, enterprises and governments. The involved transition gives a great opportunity to attackers and threat actors that can try to access a wealth of private, confidential and valuable material from homes or offices instead of attempting a risky break-in at a secure facility.

In order to address these security hazards, the above-mentioned distributed behavioral monitoring systems were applied. The analysis by such distributed behavioral monitoring systems may reveal security breaches, anomalies or inconsistencies that need to be reported to customers via selected mechanisms.

Prior art which relates to this field can be found in document US 2013/0132551, disclosing reduction of alerts in information technology systems.

According to this document, reduction of amounts of various alerts from an IT infrastructure is addressed. In so doing, false alerts are collected, current alert policies are reviewed, existing policies are updated or new policies are prepared, and the new/updated policies' false alert reduction capabilities are validated by simulation of the flow of historical data. However, according to this document, alert policies are subject to a continuous maintenance. Further, in order to improve existing policies, detection of false alerts is necessary. Hence, high effort with little automatization degree is necessary.

Accordingly, it is evident that available systems for responding to security threats suffer from various drawbacks, and it is thus desirable to improve known systems so as to overcome such drawbacks.

Hence, a problem arises of how to minimize false positive alerts preferably with reduction of analysis effort. Further, it is desirable to improve an overall detection quality of the above discussed systems.

Hence, there is a need for an improvement of distributed behavioral monitoring.

SUMMARY

Various exemplifying embodiments of the present invention aim at addressing at least part of the above issues and/or problems and drawbacks.

Various aspects of exemplifying embodiments of the present invention are set out in the appended claims.

According to an exemplary aspect of the present invention, there is provided a method comprising receiving activity data indicative of a behavior of an entity to be monitored from at least one sensor sensing activity of the entity, wherein the at least one sensor is provided to an endpoint associated with said entity, assessing an activity represented by said activity data as malicious, validating a result of said assessing based on a categorization assigned to said entity in relation to said at least one sensor, and deciding, based on a result of said validating, on a response to said assessing.

According to an exemplary aspect of the present invention, there is provided an apparatus comprising a memory configured to store computer program code, and a processor configured to read and execute computer program code stored in the memory, wherein the processor is configured to cause the apparatus to perform receiving activity data indicative of a behavior of an entity to be monitored from at least one sensor sensing activity of the entity, wherein the at least one sensor is provided to an endpoint associated with said entity, assessing an activity represented by said activity data as malicious, validating a result of said assessing based on a categorization assigned to said entity in relation to said at least one sensor, and deciding, based on a result of said validating, on a response to said assessing.

According to an exemplary aspect of the present invention, there is provided an apparatus comprising receiving circuitry configured to receive activity data from at least one sensor sensing activity of an entity to be monitored, assessing circuitry configured to assess an activity represented by said activity data as malicious, validating circuitry configured to validate a result of said assessing based on a categorization assigned to said entity in relation to said at least one sensor, and deciding circuitry configured to decide, based on a result of said validating, on a response to said assessing.

According to an exemplary aspect of the present invention, there is provided an apparatus comprising means for receiving activity data from at least one sensor sensing activity of an entity to be monitored, means for assessing an activity represented by said activity data as malicious, means for validating a result of said assessing based on a categorization assigned to said entity in relation to said at least one sensor, and means for deciding, based on a result of said validating, on a response to said assessing.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects solve at least part of the problems and drawbacks identified in relation to the prior art. Further developments and/or modifications of the aforementioned example aspects of the present invention are set out herein with reference to the drawings and exemplifying embodiments of the present invention.

By way of exemplifying embodiments of the present invention, there is provided an improvement of distributed behavioral monitoring. More specifically, by way of exemplary embodiments of the present invention, there are provided measures and mechanisms for realizing improvement of distributed behavioral monitoring.

Thus, solution of at least part of the problems is achieved by methods, apparatuses and computer program products enabling/realizing improvement of distributed behavioral monitoring.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

Figure 1:
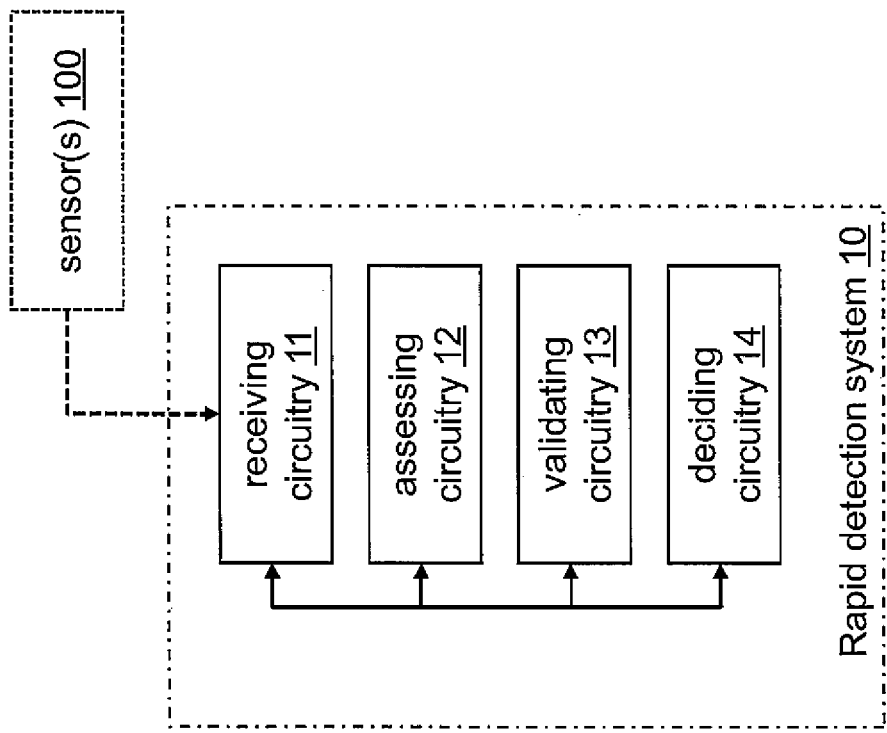
FIG. 1 is a block diagram illustrating an apparatus according to exemplary embodiments of the present invention.

The present invention is described herein with reference to particular non-limiting examples and to what are presently considered to be conceivable embodiments of the present invention. A person skilled in the art will appreciate that the present invention is by no means limited to these examples, and may be more broadly applied.

Hereinafter, various exemplifying embodiments and implementations of the present invention and its aspects are described using several variants and/or alternatives. It is generally noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown.

According to exemplifying embodiments of the present invention, in general terms, there are provided measures and mechanisms for (enabling/realizing) improvement of distributed behavioral monitoring.

Exemplary embodiments of the present invention are related to cyber security scenarios as described above, providing sensors which collect and forward data for analysis.

In such a scenario, the present invention addresses the problem of minimizing false positives alerts communicated to customers in general by inferring context based on data collected from e.g. the customer's organization. In the course of such minimization according to embodiments of the present invention, the detection quality of the affected product (e.g. rapid detection system (RDS)) is enhanced, which produces a cascade of positive side effects across the security vendor's operations.

In particular, according to exemplary embodiments of the present invention, in general, generation of context from a particular endpoint performed. This context is then used by a detection pipeline of the detection system to increase the precision of the decisions (preliminarily) taken by said pipeline.

The process according to exemplary embodiments of the present invention commences with a sensor running on an endpoint. At certain moments in time, the sensor collects specific information from the machine it is running on and a representation of the entity is built using the collected data.

According to exemplary embodiments of the present invention, the mentioned entity is any of a user, a process, a sub-network or any other describable entity.

This representation of the entity is then used by a distinct component to infer specific context usable by the detection pipeline. This component can use a wide variety of heuristic and analytical techniques, and can be located either on the same endpoint as the sensor or on another machine that the endpoint's sensor sends data to.

Hence, according to exemplary embodiments of the present invention, measures for improving the detection quality of a distributed behavioral monitoring system by collecting and utilizing context inferred by data collected at the source are provided.

Once the context is generated, it is made available to the detection pipeline, which takes it into consideration as appropriate and uses it to improve (e.g. validate) its (final) output.

Figure 4:
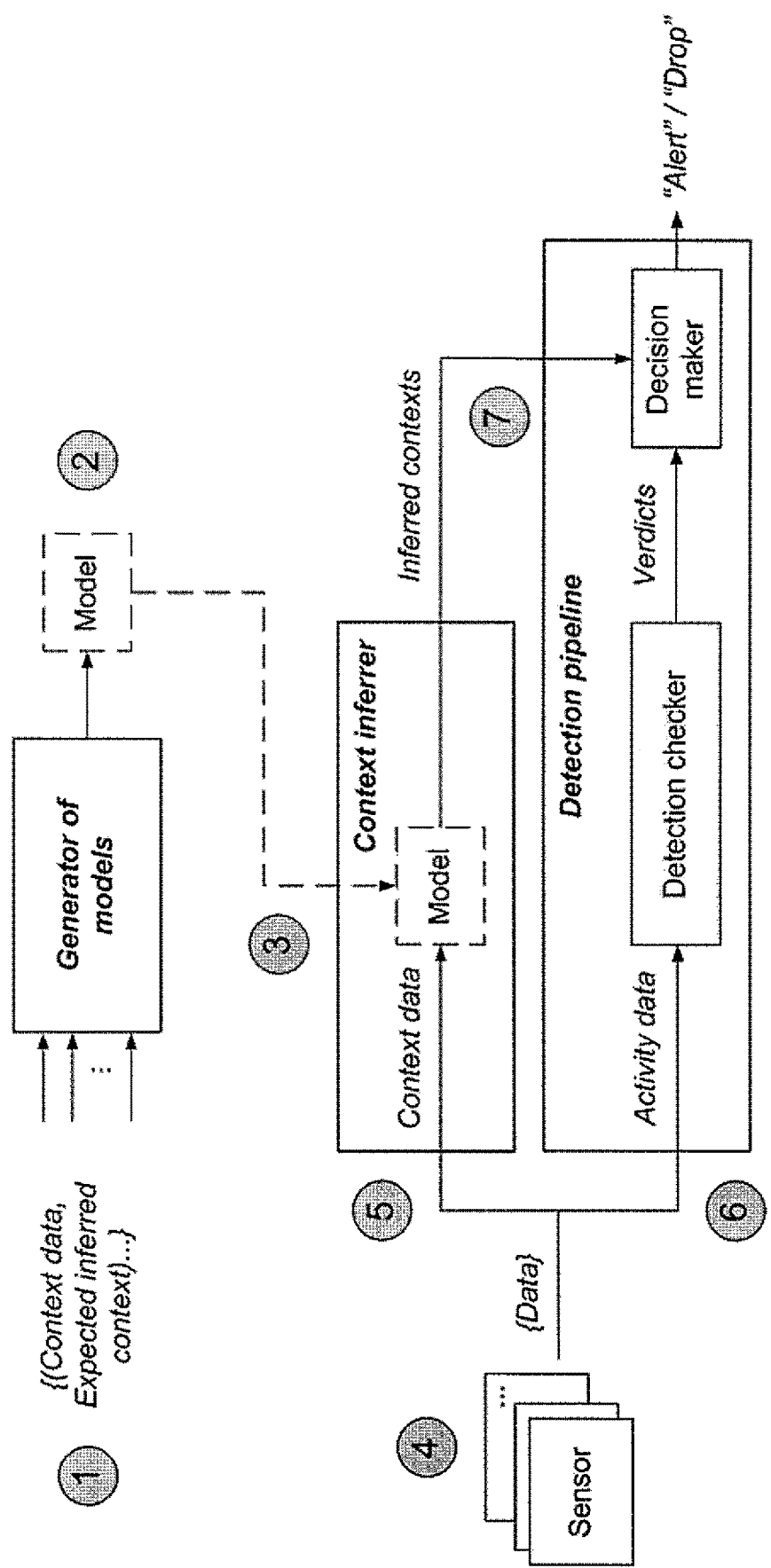
FIG. 4 shows a schematic diagram of an example of a system environment according to exemplary embodiments of the present invention.

FIG. 4 shows a schematic diagram of an example of a system environment according to exemplary embodiments of the present invention. In the following, embodiments of the present invention are explained in specific terms with reference to FIG. 4.

The system environment shown in FIG. 4 is closely related to and based on a rapid detection system (RDS), where behavior is considered as a high level concept, measured at the level of the entity under consideration. The sensor in such case is something that monitors the entity's activity by instrumenting a set of endpoints associated with the entity. Context is similarly defined as a high level category that describes a well-defined characteristic of the entity. In the case where the entity is an operating system (OS) process, the context could be "user-level process" or "system-level process", for example.

In the above-mentioned concept, two different kinds of data that is collected and used are referred to.

Activity data, is data that is collected continuously by a sensor or set of sensors and that represents the activities performed by a specific entity. This data is used to assess the security status of the relevant entity or set of entities.

Context data is data that one or more sensors collect frequently but not continuously and that is used for inferring some specific contextual aspect of the entity or entities in question.

This distinction between context data and activity data is artificial and is made for the purpose of clarity. Implementations of the present invention are conceivable in which context data and activity data are equivalent in content and format, but used for different purposes at different times.

According to FIG. 4, e.g. at a cyber security company's laboratories, a set of data is gathered (reference sign 1 in FIG. 4). This data has been previously collected through the use of a set of sensors, for which the specific context is known.

This set of data (i.e. "training set") is preferably checked for inconsistencies, invalid information and may be normalized as needed.

Under these conditions, the training data is used to create a model that can be used to automatically infer context from similarly constructed data. According to exemplary embodiments of the present invention, the methodologies used in creation of the model are of heuristic nature or of statistical nature, or use machine-learning techniques. Other techniques and principles may be utilized as well, as necessary.

According to a specific non-limiting example, the model is built using supervised machine learning techniques. After building the model, the model is preferably checked and verified, and finally accepted as valid (reference sign 2 in FIG. 4).

Once accepted, the model is pushed to a location (reference sign 3 in FIG. 4) where it can successfully receive, preprocess and normalize relevant data collected from entities of unknown context and where it can successfully submit forward the inferred context.

With reference to the setup described, e.g. at a customer organization's site, one or more sensors execute (reference sign 4 in FIG. 4). As part of their normal execution flow, activity is collected from relevant entities.

According to exemplary embodiments of the present invention, collected data required to infer context is sent forward to the model generated as described above (reference sign 5 in FIG. 4). This forwarding may be effected at a suitable predefined time, for example at startup, or every day at 21 o'clock, etc.

The collected data required to infer context may be of various nature.

According to a non-limiting example, a sensor collects names of installed applications on the endpoint and submits that list to the model. Following on this example, knowing which applications are installed on an endpoint helps understanding/determining what the role of the machine is and potentially what the role of the user is that will make use of the endpoint. As an example, if the only applications installed on a machine are standard office tools (MS Word, MS Excel, etc.), then the model could infer the context "Office Worker", Conversely, if developer tools (MS Visual Studio, various text editors, etc.) or administration tools (SSH, Putty, etc.) are found, then the model could infer the context "DevOps Engineer".

The collected data required to infer context may be of different nature as required by the specific characteristics of the context and entity being monitored.

Returning to FIG. 4, as mentioned above, context data is sent (i.e., the involved sensors transmits the context data) to an interface serving as an input to the context-inferring model (reference sign 5 in FIG. 4), According to exemplary embodiments of the present invention, once the context data reaches the model, the model infers the context according to the data and the inferred context is associated with the entity or entities and finally stored.

In addition thereto, the involved sensors transmit activity data to the backend of e.g. the rapid detection system. Namely, as part of its operations, the deployed sensors routinely submit data representing activities associated with monitored entities (reference sign 6 in FIG. 4). This data is fed eventually to the detection pipeline which (preliminarily) decides, depending on the data, on e.g. generating a security alert (or any other suitable warning measure).

According to exemplary embodiments of the present invention, information about the entity or entities concerned is retrieved from the generated security alert (or the any other suitable warning measure) and is further used to retrieve the context previously inferred about that particular entity or entities.

The retrieved context is then used by a final decision making system (reference sign 7 in FIG. 4), which evaluates the security alert in light of the retrieved context.

In so doing, not only can false positives mitigated in detecting malicious behavior but also the detection capabilities of a system (e.g. rapid detection system) can be increased.

In the following, exemplary embodiments of the present invention are described in more general terms in relation to FIGS. 1 to 3.

FIG. 1 is a block diagram illustrating an apparatus according to exemplary embodiments of the present invention. The apparatus may be rapid detection system 10 comprising a receiving circuitry 11 assessing circuitry 12 validating circuitry 13 and deciding circuitry 14. The receiving circuitry 11 receives activity data from at least one sensor 100 sensing activity of an entity to be monitored. The assessing circuitry 12 assesses an activity represented by said activity data as malicious. The validating circuitry 13 validates a result of the assessing by the assessing circuitry 12 based on a categorization assigned to said entity in relation to said at least one sensor 100. The deciding circuitry 14 decides, based on a result of the validating by the validating circuitry 13 on a response to said assessing by the assessing circuitry 12.

Figure 3:
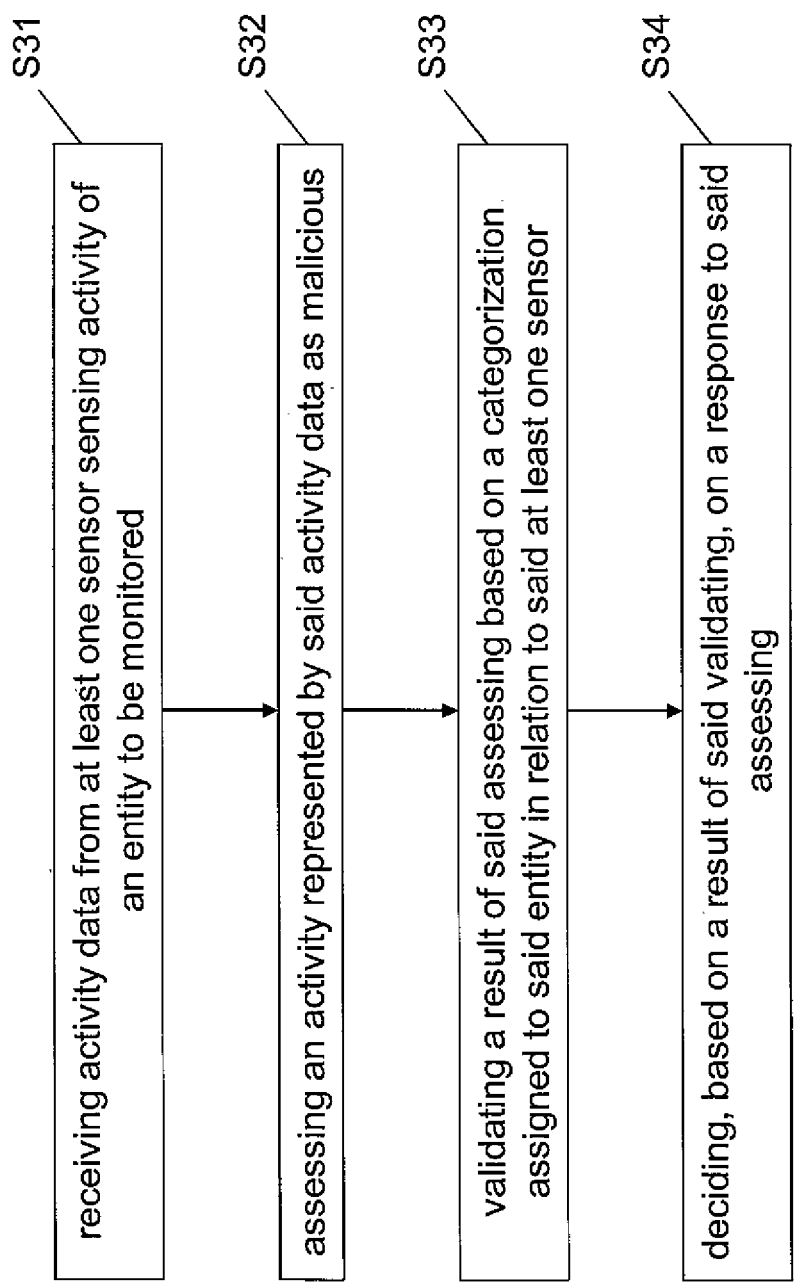
FIG. 3 is a schematic diagram of a procedure according to exemplary embodiments of the present invention.

FIG. 3 is a schematic diagram of a procedure according to exemplary embodiments of the present invention. The apparatus according to FIG. 1 may perform the method of FIG. 3 but is not limited to this method. The method of FIG. 3 may be performed by the apparatus of FIG. 1 but is not limited to being performed by this apparatus.

As shown in FIG. 3, a procedure according to exemplary embodiments of the present invention comprises an operation of receiving (S31) activity data from at least one sensor sensing activity of an entity to be monitored, an operation of assessing (S32) an activity represented by said activity data as malicious, an operation of validating (S33) a result of said assessing (S32) based on a categorization assigned to said entity in relation to said at least one sensor, and an operation of deciding (S34), based on a result of said validating (S33), on a response to said assessing (S32).

Figure 2:
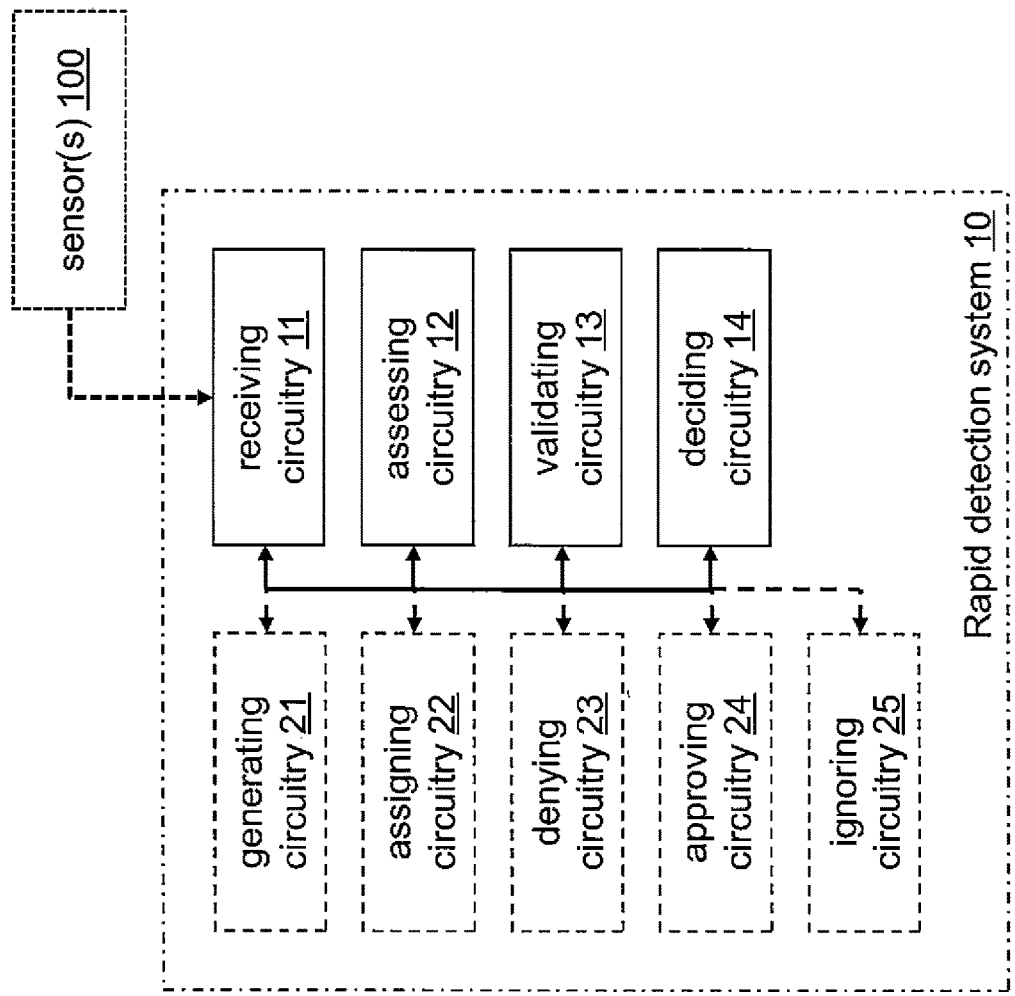
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise generating circuitry 21, assigning circuitry 22, denying circuitry 23, approving circuitry 24, and/or ignoring circuitry 25.

In an embodiment at least some of the functionalities of the apparatus shown in FIG. 1 (which may be rapid detection system 10) may be shared between two or more physically separate devices (which may be distributed to different locations) forming one operational entity. Therefore, the apparatus may be seen to depict the operational entity comprising one or more physically separate devices for executing at least some of the described processes.

Furthermore, according to exemplary embodiments of the present invention, the rapid detection system 10 comprises the sensor(s) 100.

According to a variation of the procedure shown in FIG. 3, exemplary additional operations are given, which are inherently independent from each other as such. According to such variation, an exemplary method according to exemplary embodiments of the present invention may comprise an operation of receiving context data from said at least one sensor, an operation of generating said categorization based on said context data and a categorization model, and an operation of assigning said categorization to said entity in relation to said at least one sensor.

According to a variation of the procedure shown in FIG. 3, exemplary details of the validating operation (S33) are given, which are inherently independent from each other as such.

Such exemplary validating operation (S33) according to exemplary embodiments of the present invention may comprise an operation of denying said result of said assessing, if said activity is permitted in relation to said categorization, and an operation of approving said result of said assessing, if said activity is not permitted in relation to said categorization.

According to a variation of the procedure shown in FIG. 3, exemplary details of the deciding operation (S34) are given, which are inherently independent from each other as such.

Such exemplary deciding operation (S34) according to exemplary embodiments of the present invention may comprise an operation of generating a security alert, if said result of said assessing is approved, and an operation of ignoring said result of said assessing, if said result of said assessing is denied.

According to exemplary embodiments of the present invention, said categorization model is generated based on a set of training data attributed with said categorization, wherein a type of said training data corresponds to a type of said context data. According to still further exemplary embodiments of the present invention, this generation of the categorization model may be performed by the above described rapid detection system 10 as well.

According to further exemplary embodiments of the present invention, said entity is a component or user of a data processing system or of a data processing compound. Preferably, the entity is one of a user logged into said data processing system, a process running on said data processing system, a hardware unit of said data processing system, said data processing system in said data processing compound, and a sub-network in said data processing compound.

According to further exemplary embodiments of the present invention, said activity data is continuously collected by said at least one sensor and indicative of a behavior of said entity, and said context data is intermittently collected by said at least one sensor and indicative of at least one characteristic of said entity in relation to said categorization. Thus, in case the rapid detection system 10 comprises the sensor(s) 100, the rapid detection system 10 is configured to (via the sensor(s) 100 of the rapid detection system 10) continuously collect said activity data and to intermittently collect said context data.

According to further exemplary embodiments of the present invention, said sensor is provided to an endpoint associated with said entity.

In the following, exemplary embodiments of the present invention are described by means of a concrete example.

This example is based on a typical principle of the present invention. Namely, when an alert is (preliminarily) triggered by the detection pipeline, the corresponding activity data might refer to a malicious act or set of acts. Conversely, the corresponding activity data could be the result of specific activity that is only syntactically similar to malicious one, but benign in nature.

This is a fairly common scenario, especially as advanced actors might rely on standard administration tools, which are preinstalled by default on operating systems, to carry out their tasks.

For the present example the ipconfig.exe program that is part of the MS Windows operating system is considered. On the one hand, this program is a reputable, Microsoft written tool that is used for networking. However, it is also often used by attackers to quickly retrieve the IP address of a Windows machine that has been compromised.

In such scenario, the availability of a context according to the present invention is invaluable.

Namely, associating the execution of ipconfig.exe (for example: "ipconfig.exe/all") with a breach would be a sure way to generate a lot of false positives. Another possible consequence of such approach is that the association would have to be linked to a severity of "low", reducing the overall effectiveness of the system. However, since the execution of ipconfig.exe (for example: "ipconfig.exe/all") is often used by attackers, it would be inadequate to refrain from considering such behavior in detection of maliciousness.

When using the context according to exemplary embodiments of the present invention, the above outlined dilemma can be limited/solved effectively.

The usage of the context in line with exemplary embodiments of the present invention may in the present concrete example be implemented by an algorithm as follows.

It is noted that the algorithm is presented in a pseudo programming language for comprehension purposes. The way of implementation, however, is not limited to this example.

[Begin of exemplary algorithm]
    If "ipconfig.exe /all" has been detected on sensor X for user Y then
        If context associated to sensor X and user Y is "DevOps engineer" then
            Do nothing (which may involve "suppress alert", "continue monitoring", etc.)
        Else
            Generate alert with high severity
[End of exemplary algorithm]

In a further exemplary scenario, a connection between two particular endpoints is discovered thanks to the deployed set of sensors. If the two endpoints would be located in the same subnetwork, then potentially the event could be of a benign nature. Conversely, the fact that the connection originates from a different subset could indicate that something malicious is happening.

Accordingly, the context in line with exemplary embodiments of the present invention may be related to belonging to respective subnets, and a decision based on such context may be based on an algorithm which in turn considers the belonging to respective subnets.

It is to be understood that the above examples do not capture the genericity of the invention, which extends to cover any instrumentable entity that can be described by semantic attributes.

However, the availability of contextual information according to exemplary embodiments of the present invention enables a security system to increase its ability of correctly identifying malicious and suspicious activity. Similarly to the examples above, the simple logic of the final verification system may turn a weak indicator of compromise (IOC) into a strong one with high confidence by taking into consideration the context associated to the entity being flagged.

The above-described procedures and functions may be implemented by respective functional elements, processors, or the like, as described below.

Figure 5:
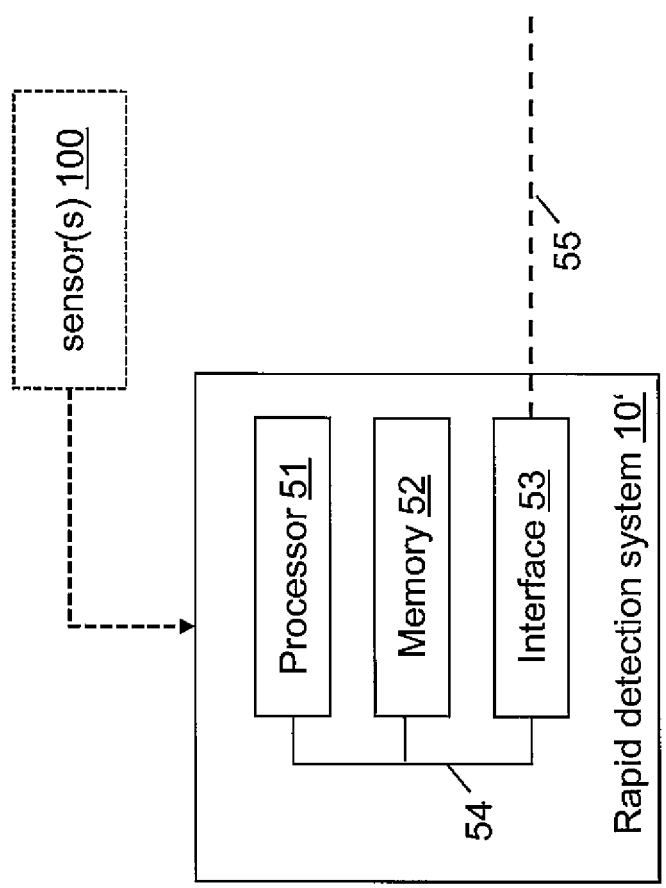
FIG. 5 is a block diagram alternatively illustrating a system according to exemplary embodiments of the present invention.

In FIG. 5, an alternative illustration of apparatuses according to exemplary embodiments of the present invention is depicted. As indicated in FIG. 5, an apparatus 10' according to exemplifying embodiments of the present invention (corresponding to apparatus 10) may comprise at least one processor 51 and at least one memory 52 (and possibly also at least one interface 53), which may be operationally connected or coupled, for example by a bus 54 or the like, respectively.

The processor 51 of the apparatus 10' (representing the rapid detection system) is configured to read and execute computer program code stored in the memory 52. The processor may be represented by a CPU (Central Processing Unit), a MPU (Micro Processor Unit), etc., or a combination thereof. The memory 52 of the apparatus 10' is configured to store computer program code, such as respective programs, computer/processor-executable instructions, macros or applets, etc. or parts of them. Such computer program code, when executed by the processor 51, enables the apparatus 10' to operate in accordance with exemplifying embodiments of the present invention. The memory 52 may be represented by a RAM (Random Access Memory), a ROM (Read Only Memory), a hard disk, a secondary storage device, etc., or a combination of two or more of these. The interface 53 of the apparatus 10' is configured to interface with another apparatus and/or a user of the apparatus 10'. That is, the interface 53 may represent a communication interface (including e.g. a modem, an antenna, a transmitter, a receiver, a transceiver, or the like) and/or a user interface (such as a display, touch screen, keyboard, mouse, signal light, loudspeaker, or the like).

The apparatus 10' or its processor 51 (possibly together with computer program code stored in the memory 52), in its most basic form, is configured to receive activity data from at least one sensor sensing activity of an entity to be monitored, to assess an activity represented by said activity data as malicious, to validate a result of said assessing based on a categorization assigned to said entity in relation to said at least one sensor, and to decide, based on a result of said validating, on a response to said assessing.

Figure 6:
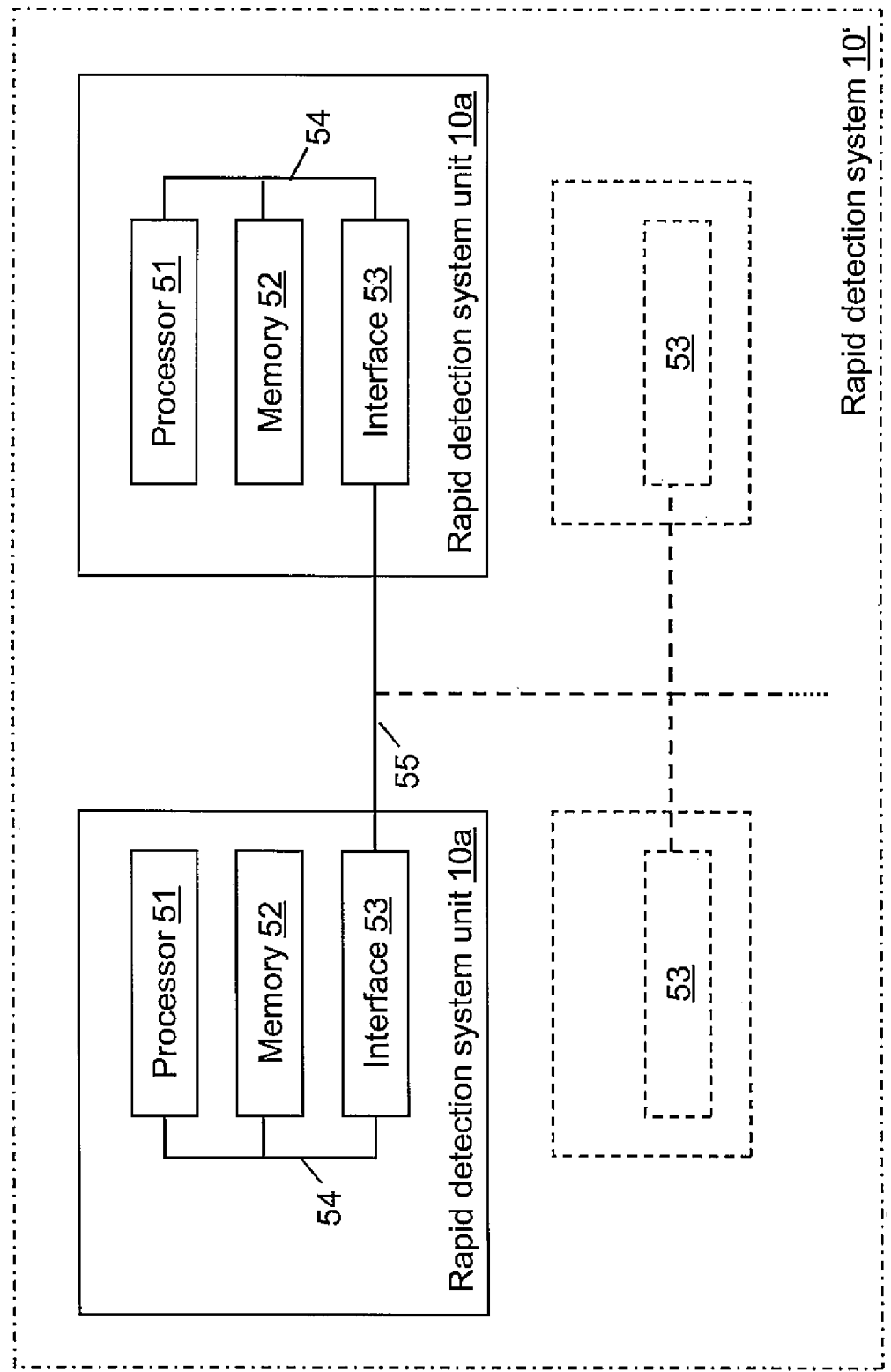
FIG. 6 is a block diagram alternatively illustrating a system according to exemplary embodiments of the present invention.

FIG. 6 is a block diagram alternatively illustrating a system according to exemplary embodiments of the present invention.

In FIG. 6, a rapid detection system 10' according to exemplary embodiments of the present invention is illustrated which comprises at least two rapid detection system units 10a which are structures as the rapid detection system 10' described in relation to FIG. 5.

Such a rapid detection system 10' as shown in FIG. 6, in its most basic form, is configured to receive activity data from at least one sensor sensing activity of an entity to be monitored, to assess an activity represented by said activity data as malicious, to validate a result of said assessing based on a categorization assigned to said entity in relation to said at least one sensor, and to decide, based on a result of said validating, on a response to said assessing in such a way that any of the rapid detection system units 10a is configured for such functionality, and/or that each of the rapid detection system units 10a is configured for at least a part of the functionality.

Accordingly, any one of the above-described schemes, methods, procedures, principles and operations may be realized in a computer-implemented manner.

Any apparatus according to exemplifying embodiments of the present invention may be structured by comprising respective units or means for performing corresponding operations, procedures and/or functions. For example, such means may be implemented/realized on the basis of an apparatus structure, as exemplified in FIG. 5 or 6 above, i.e. by one or more processors 51, one or more memories 52, one or more interfaces 53, or any combination thereof.

An apparatus according to exemplifying embodiments of the present invention may comprise (at least) a unit or means for receiving activity data from at least one sensor sensing activity of an entity to be monitored, a unit or means for assessing an activity represented by said activity data as malicious, a unit or means for validating a result of said assessing based on a categorization assigned to said entity in relation to said at least one sensor, and a unit or means for deciding, based on a result of said validating, on a response to said assessing.

For further details regarding the operability/functionality of the individual elements according to exemplifying embodiments of the present invention, reference is made to the above description in connection with any one of FIGS. 1 to 4, respectively.

According to exemplifying embodiments of the present invention, any one of the processor, the memory and the interface may be implemented as individual modules, chips, chipsets, circuitries or the like, or one or more of them can be implemented as a common module, chip, chipset, circuitry or the like, respectively.

According to exemplifying embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units, means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible or non-transitory medium such as a computer-readable (storage) medium having stored thereon a respective data structure or code means/portions or embodied in a signal or in a chip, potentially during processing thereof. A computer program product encompasses a computer memory encoded with executable instructions representing a computer program for operating/driving a computer connected to a network.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for improvement of distributed behavioral monitoring. Such measures exemplarily comprise receiving activity data from at least one sensor sensing activity of an entity to be monitored, assessing an activity represented by said activity data as malicious, validating a result of said assessing based on a categorization assigned to said entity in relation to said at least one sensor, and deciding, based on a result of said validating, on a response to said assessing.

Even though the invention is described above with reference to the examples and exemplifying embodiments with reference to the accompanying drawings, it is to be understood that the present invention is not restricted thereto. Rather, it is apparent to those skilled in the art that the above description of examples and exemplifying embodiments is for illustrative purposes and is to be considered to be exemplary and non-limiting in all respects, and the present invention can be modified in many ways without departing from the scope of the inventive idea as disclosed herein.

LIST OF ACRONYMS AND ABBREVIATIONS

IOC indicator of compromise
OS operating system
RDS rapid detection system

The invention claimed is:
1. A method, comprising:
receiving, by a detection system, continuously collected activity data by at least one sensor indicative of a behavior of one of a user level process or a system level process of an entity, wherein the behavior of the entity is monitored by the at least one sensor, wherein the at least one sensor is provided to monitor applications installed on an endpoint associated with said entity;
receiving, by the detection system, intermittently collected context data from the at least one sensor;
generating a categorization based on said context data and a categorization model, and assigning said categorization to said entity in relation to said at least one sensor;
assessing an activity of said entity represented by said activity data as malicious;
validating a result of said assessing said activity as malicious based on the monitored applications installed on the endpoint and based on said categorization assigned to said entity in relation to said at least one sensor, wherein said context data is indicative of at least one characteristic of said entity in relation to said assigned categorization, and wherein said categorization model is generated at least based on a set of training data attributed with said assigned categorization; and
approving, based on the validating, said result of said assessing said activity as malicious in response to determining said activity represented by said activity data is not permitted in relation to said assigned categorization,
generating a security alert based on said approving, and communicating, based on said approving, to the entity the security alert and an indication of the assigned categorization for processing data associated with the activity data assessed as malicious; or
denying, based on the validating, said result of said assessing said activity as malicious in response to determining said activity represented by said activity data is permitted in relation to said assigned categorization.

2. The method according to claim 1, wherein the detection system comprises two or more physically separate devices forming one operational entity.

3. The method according to claim 2, wherein the two or more physically separated devices are distributed to different locations.

4. The method according to claim 1, wherein
wherein a type of said training data corresponds to a type of said context data.

5. The method according to claim 1, wherein
said entity is a component or user of a data processing system or of a data processing compound.

6. The method according to claim 5, wherein
said entity is one of a user logged into said data processing system, a process running on said data processing system, a hardware unit of said data processing system, said data processing system in said data processing compound, and a sub-network in said data processing compound.

7. The method according to claim 1, wherein
said activity data is collected by said at least one sensor and indicative of a behavior of said entity, and
said context data is collected by said at least one sensor and indicative of at least one characteristic of said entity in relation to said categorization.

8. The method according to claim 1, wherein
said sensor is embodied in said endpoint associated with said entity.

9. The method according to claim 1, wherein the categorization is based at least on monitoring collected names of the monitored applications installed on the endpoint.

10. An apparatus, comprising
a memory configured to store computer program code, and
a processor configured to read and execute computer program code stored in the memory,
wherein the processor is configured to cause the apparatus to perform:
receiving, by a detection system, continuously collected activity data by at least one sensor indicative of a behavior of one of a user level process or a system level process of an entity, wherein the behavior of the entity is monitored by the at least one sensor, wherein the at least one sensor is provided to monitor applications installed on an endpoint associated with said entity;
receiving, by the detection system, intermittently collected context data from the at least one sensor;
generating a categorization based on said context data and a categorization model, and assigning said categorization to said entity in relation to said at least one sensor;
assessing an activity of said entity represented by said activity data as malicious,
validating a result of said assessing said activity as malicious based on the monitored applications installed on the endpoint and based on said categorization assigned to said entity in relation to said at least one sensor, wherein said context data is indicative of at least one characteristic of said entity in relation to said assigned categorization, and wherein said categorization model is generated at least based on a set of training data attributed with said assigned categorization; and
approving, based on the validating, said result of said assessing said activity as malicious in response to determining said activity represented by said activity data is not permitted in relation to said assigned categorization,
generating a security alert based on said approving, and communicating, based on said approving, to the entity the security alert and an indication of the assigned categorization for processing data associated with the activity data assessed as malicious; or
denying, based on the validating, said result of said assessing said activity as malicious in response to determining said activity represented by said activity data is permitted in relation to said assigned categorization.

11. The apparatus according to claim 10, wherein the detection system comprises two or more physically separate devices forming one operational entity.

12. The apparatus according to claim 11, wherein the two or more physically separated devices are distributed to different locations.

13. The apparatus according to claim 10, wherein
wherein a type of said training data corresponds to a type of said context data.

14. The apparatus according to claim 10, wherein
said entity is a component or user of a data processing system or of a data processing compound.

15. The apparatus according to claim 14, wherein
said entity is one of a user logged into said data processing system, a process running on said data processing system, a hardware unit of said data processing system, said data processing system in said data processing compound, and a sub-network in said data processing compound.

16. The apparatus according to claim 10, wherein
said activity data is collected by said at least one sensor and indicative of a behavior of said entity, and
said context data is collected by said at least one sensor and indicative of at least one characteristic of said entity in relation to said categorization.

17. The apparatus according to claim 10, wherein
said sensor is embodied in said endpoint associated with said entity.

18. A non-transitory computer storage medium having stored thereon computer program code executed by at least one processor to perform:
receiving, by a detection system, continuously collected activity data by at least one sensor indicative of a behavior of one of a user level process or a system level process of an entity, wherein the behavior of the entity is monitored by the at least one sensor, wherein the at least one sensor is provided to monitor applications associated with said entity, wherein the at least one sensor is provided to monitor applications installed on an endpoint associated with said entity;
receiving, by the detection system, intermittently collected context data from the at least one sensor;
generating a categorization based on said context data and a categorization model, and assigning said categorization to said entity in relation to said at least one sensor;
assessing an activity of said entity represented by said activity data as malicious;
validating a result of said assessing said activity as malicious based on the monitored applications installed on the endpoint and based on said categorization assigned to said entity in relation to said at least one sensor, wherein said context data is indicative of at least one characteristic of said entity in relation to said assigned categorization, and wherein said categorization model is generated at least based on a set of training data attributed with said assigned categorization; and
approving, based on the validating, said result of said assessing said activity as malicious in response to determining said activity represented by said activity data is not permitted in relation to said assigned categorization,
generating a security alert based on said approving, and communicating, based on said approving, to the entity the security alert and an indication of the assigned categorization for processing data associated with the activity data assessed as malicious; or
denying, based on the validating, said result of said assessing said activity as malicious in response to determining said activity represented by said activity data is permitted in relation to said assigned categorization.

* * * * *